(12) United States Patent
Koenen

(10) Patent No.: US 7,163,029 B2
(45) Date of Patent: Jan. 16, 2007

(54) PRESSURIZED FLUID CONDUIT

(75) Inventor: Jacob Koenen, Sittard (NL)

(73) Assignee: DSM IP Assets B.V., Te Heerlen (NL)

( * ) Notice: Subject to any disclaimer, the term of this patent is extended or adjusted under 35 U.S.C. 154(b) by 951 days.

(21) Appl. No.: 10/171,383

(22) Filed: Jun. 14, 2002

(65) Prior Publication Data

US 2003/0024586 A1 Feb. 6, 2003

(30) Foreign Application Priority Data

Jun. 15, 2001 (EP) .................................. 01202305

(51) Int. Cl.
*F16L 11/11* (2006.01)
(52) U.S. Cl. ............... 138/121; 138/DIG. 7; 428/36.92
(58) Field of Classification Search ................ 138/118, 138/121, DIG. 7; 428/36.92
See application file for complete search history.

(56) References Cited

U.S. PATENT DOCUMENTS

| | | | |
|---|---|---|---|
| 3,294,122 A * | 12/1966 | Sharp | 138/110 |
| 4,367,316 A * | 1/1983 | Tanaka et al. | 525/173 |
| 4,852,564 A * | 8/1989 | Sheridan et al. | 128/202.27 |
| 5,005,613 A * | 4/1991 | Stanley | 141/45 |
| 5,060,697 A * | 10/1991 | Weinheimer | 138/121 |
| 5,305,800 A * | 4/1994 | Kolberg | 138/121 |
| 5,676,175 A * | 10/1997 | Bar et al. | 138/97 |
| 5,804,658 A * | 9/1998 | Schmidt et al. | 525/168 |
| 5,910,346 A * | 6/1999 | Ward et al. | 428/36.9 |
| 6,056,018 A * | 5/2000 | Renaud | 138/121 |
| 6,288,171 B1 * | 9/2001 | Finerman et al. | 525/192 |
| 6,583,200 B1 * | 6/2003 | Loontjens et al. | 523/216 |

FOREIGN PATENT DOCUMENTS

| | | |
|---|---|---|
| DE | 198 31 898 | 1/2000 |
| DE | 198 31 898 A1 | 1/2000 |
| JP | 2000 0888151 | 3/2000 |

OTHER PUBLICATIONS

Derwent Publications Ltd., AN 2000-307266; English Abstract of JP 2000 088151, Mar. 31, 2000.

* cited by examiner

*Primary Examiner*—James Hook
(74) *Attorney, Agent, or Firm*—Nixon & Vanderhye, P.C.

(57) ABSTRACT

A pressurized fluid conduit includes a mono-layer of a semi-crystalline thermoplastic material that has a hardness of between 50 and 65 Shore D and a modulus at 150° C. of at least 60 MPa. The semi-crystalline thermoplastic material may be used for making a mono-layered pressurized fluid conduit via an extrusion molding process, such as an extrusion blow-molding process.

27 Claims, 1 Drawing Sheet

Figure 1:
Figure 1:
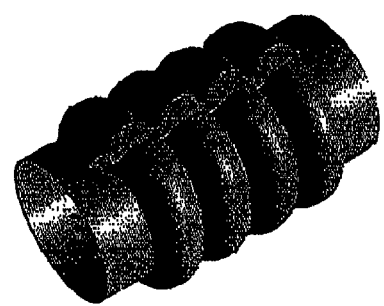
Figure 1:
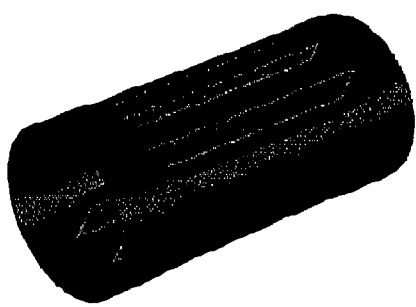
Figure 1:
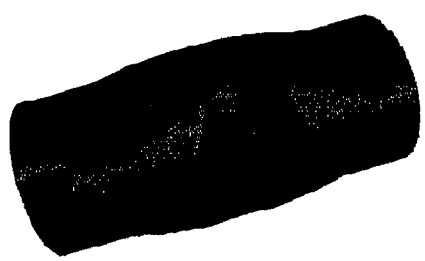
Figure 1:
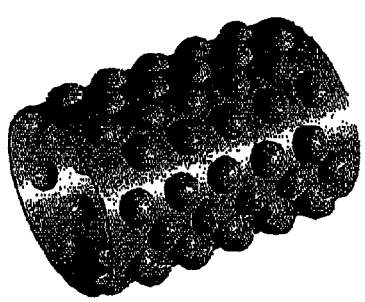
Figure 1:
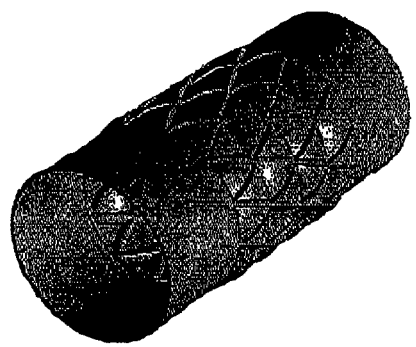

1a
1b 1c
1d 1e
1f

PRESSURIZED FLUID CONDUIT

The invention relates to a pressurized fluid conduit. The invention also concerns the use of a semi-crystalline thermoplastic material with specific properties for making a mono-layered pressurized fluid conduit via an extrusion moulding process, and a process for making such a conduit.

Such a pressurized fluid conduit is, inter alia, known from JP 2000 088151 A. In this patent application a multi-layered tubular moulded article is described, comprising an inner layer consisting of a semi-crystalline ester-based elastomer (I) having a hardness of between 50 and 70 Shore D and an outer layer consisting of a semi-crystalline ester-based elastomer (II) having a hardness of between 30 and 50 Shore D. The elastomer (II) is a block copolymer comprising hard blocks of semi-crystalline polyester and soft blocks of a polyether, the blocks being connected to each other by urethane bonds.

Within the present application a pressurized fluid conduit is understood to include various means for conveying a fluid, such as air or liquids, at pressures of about 70–500 kPa, which conduit is also often operated at elevated temperatures, e.g. of up to 180° C. Examples of such a pressurized fluid conduit include corrugated or convoluted pipes or hoses, and ducts comprising at least one section with smooth wall surface and optionally at least one section with wall geometries that effect deflection, for example a corrugated wall, like an automobile air-duct or coolant line. A corrugated wall section is understood to mean a part of the conduit in the form of a pipe or tube with a corrugated structure, for example a plurality of raised circumferential contours spaced at some interval from each other in the axial direction of the pipe. These contours can have quite different geometries, like circles, ovals, ellipses, tri- or multi-angular forms, etc. Corrugations are also referred to as convoluted, both terms being used interchangeably. The advantage of a corrugated section is that it improves the bending flexibility of a conduit. Deflection or bending flexibility can also be made different in different bending directions by choosing corrugates of specific geometries, or noncircumferential corrugates. The choice of material from which the conduit is made is therefore critical, since the conduit should not only fulfill performance requirements regarding e.g. burst-pressure end deformation at elevated operating temperatures, but the conduit should also show good flexibility to allow easy handling and assembling at lower temperatures, especially at room temperature. In addition, its chemical resistance to for example typical automotive fluids and oils needs to be high, in the known conduit, a combination of different materials in separate layers is applied in order to obtain the desired performance.

A disadvantage, however, of the pressurized fluid conduit known from JP 2000 088151 A is, that such multi-layered conduit is rather complex and costly to produce.

The object of the invention is therefore to provide a pressurized fluid conduit that does not, or at least to a much lesser extent, show these disadvantages, This object is achieved with the pressurized fluid conduit according to the invention, comprising a mono-layer of a semi-crystalline thermoplastic material having a hardness of between 50 and 65 Shore D and a modulus at 150° C. of at least 60 MPa.

The pressurized fluid conduit according to the invention is mono-layered and easy to produce by applying the specific thermoplastic material, and still provides the desired combination of flexibility in assembling and resistance to high temperatures and chemicals.

It was surprising to find that a conduit comprising a mono-layer of a specific thermoplastic material, which is of comparable Shore D hardness as the material in the inner layer of the known conduit, and not comprising an outer layer of a softer and more flexible material still shows good flexibility during assembling at room temperature.

Another advantage of the pressurized fluid conduit according to the invention is that it allows significant savings in material use end thus further cost reduction. Still another advantage of the pressurized fluid conduit according to the invention is that an automobile air-intake system comprising such a conduit as an air-duct can more efficiently absorb engine vibrations after e.g. a cold-start, even at temperatures as low as −35° C. A further advantage is that the pressurized fluid conduit according to the invention results in improved noise reduction, especially in the 1500–3200 Hz range.

Within the context of the present invention a mono-layered conduit comprises a single layer or a thermoplastic material or composition as the constructive layer of the conduit; that is as the layer providing the conduit its mechanical properties and allowing It to be operated at elevated temperatures. The conduit may further comprise other layers, which do not or virtually not contribute to mechanical properties of the conduit; like a coating layer for aesthetic or protective purposes.

A mono-layered pressurized fluid conduit is also known from DE 15707618 C. In this patent specification a corrugated pipe for use as a fluid line is described, preferably made from a polyamide or a blend thereof with other polymers: because such materials combine suitable mechanical, chemical, and barrier properties in a single layered pipe. A mono-layered air-duct with improved resistance to longitudinal elongation at high temperatures and made from a thermoplastic material is also disclosed by U.S. Pat. No. 6,056,018A. These publications, however, do not disclose or suggest that the specific thermoplastic material according to the present invention enables making a mono-layered conduit with the advantageous combination of good flexibility upon assembling and resistance to deformation at elevated temperatures.

Preferably, the thermoplastic material in the pressurized fluid conduit according to the invention has a hardness of between 52 and 63, more preferably of between 54 and 61 Shore D. The hardness according to Shore D is measured at room temperature with a method following the instructions at ISO 868. The advantage at a material with such hardness is that a good balance is offered between mechanical strength end flexibility of the conduit, especially at ambient temperatures around room temperature.

As thermoplastic material in the pressurized fluid conduit according to the invention various semi crystalline materials can be used, as long as they fulfill typical requirements of the targeted application, like a sufficiently high melt temperature, generally above 150° C., mechanical properties and chemical and thermal resistance. Suitable thermoplastics include polyamides and polyesters, and especially polyamide- and polyester-based flexible or elastomeric materials like block copolymers or blends with low modulus or rubbery polymers. A semi-crystalline thermoplastic material based on polyester is preferred, considering its well-balanced combination of above-mentioned properties and low sensitivity of mechanical properties to changing humidity conditions.

The thermoplastic material in the pressurized fluid conduit according to the invention preferably has a modulus of at least 70 at 150° C. more preferably at least 80 MPa at 150°

C. The advantage of using a material with higher modulus at elevated temperature is that the conduit is surprisingly found to offer higher flexibility at e.g. room temperature. Within the context at this application, modulus is understood to mean modulus in strain, as measured with a Dynamic Mechanical Spectrometer (DMS) on a test-sample that is dynamically elongated in a certain temperature range at a frequency of 1 Hz, following ASTM D5026.

Within the automobile industry there is a continuing development towards higher temperatures being used in and near the engine. Also within the air-and fuel-control system this trend is apparent. Normal operating temperatures, for example, in an air-duct are nowadays in the range of 120–140° C., but are moving towards 140–160° C., with peak temperatures reaching 180° C. or above. This is especially the case in so-called turbocharger-ducts that are used in diesel engines, where operating temperatures could even exceed 160° C. in the near future. The thermoplastic material in the pressurized fluid conduit according to the invention there for preferably has a modulus at 160° C. of at least 50, more preferably at least 60, and even more preferably at least 70 MPa. Even more preferred, the pressurized fluid conduit according to the invention comprises a mono-layer of a thermoplastic material that displays a modulus at 170° C. of at least 50, more preferably at least 60, and even more preferably at least 70 MPa.

The pressurized fluid conduit according to the invention can be made from the thermoplastic material via known melt processing steps, for example via an extrusion process, optionally followed by a blow- and/or suction-moulding step in order to form a desired geometry. Preferred processes are extrusion blow-moulding techniques, including suction blow-moulding and sequential blow-moulding, each optionally with tube manipulation to produce more complex 3-dimensionally shaped conduits. With a sequential blow-moulding process a conduit may be made, comprising different sections of e g varying stiffness, one at which is a mono-layered section of a thermoplastic material as defined above.

In a preferred embodiment according to the invention, the conduit is an extrusion blow-moulded part made from a thermoplastic material as defined above, having a melt viscosity as measured at 240° C. and at shear rate 1 $s^{-1}$ of between 8 and 35, preferably between 9 and 30 kPa·s. Such a melt viscosity measurement can for example be performed with a dynamical mechanical spectrometer using a plate/plate geometry. Depending on the melting point of the thermoplastic material the temperature of measurement may be adjusted.

Preferably, the pressurized fluid conduit according to the invention comprises at least one section with wall geometry that affects deflection, in order to further enhance bending flexibility of the conduit. Within the present application, a section with wall geometry that affects deflection is understood to mean a section with such wall structure that bending of the conduit is facilitated or restricted in a specific direction. Typical examples include sections with conventional circumferential corrugates of various geometries, or non-circumferential corrugates. More preferably the corrugated section of the conduit has corrugates of such geometries that longitudinal elongation of the conduit when operating under pressure at high operating temperature is reduced or substantially prevented; like the presence of ribs connecting adjacent corrugates, or a longitudinal zone wherein the corrugate is interrupted, or made substantially even with the surface of the pipe, as for example described in DE 19707518 C.

Other possible sections with wall geometries that affect deflection are presented in FIG. 1, which figure shows in perspective view schematic representations of a section of a conduit.

In FIG. 1a a section of a conduit is depicted, in which two opposing axial corrugates are present across circumferential corrugates, the surface of the axial corrugates extending above the outer surface of a smooth wall section of the conduit.

In FIG. 1b a similar conduit as in FIG. 1a is shown, but now the axial corrugates extend below the wall surface to the inside of the conduit.

The conduit visualised as 1c has only some axial corrugates at two opposite surfaces, thereby allowing bending in two opposite directions, while increasing stiffness in the other directions.

In FIG. 1d a conduit is shown that has a squeezed appearance, that is, it has two pairs of large corrugates that facilitate bending in two opposite directions, but reduce deflection in the other directions.

FIG. 1e and 1f show conduit sections with a plurality of circular and triangular grids, respectively, recessing from the wall surfaces. The smooth wall sections can be considered as connected via a plurality of paths. These geometries have surprisingly been found to enable a conduit that shows improved bending flexibility in all directions and that still shows substantially no longitudinal elongation when under pressure.

It will be clear that such geometries are not only advantageous in case of mono-layered conduits, but also apply to multi-layered constructions.

In a specially preferred embodiment the pressurized fluid conduit according to the invention is an automobile air-duct e.g. comprising a first tubular pipe section, a section with wall geometry that affects deflection, for example a corrugated section, and a second tubular section, because the specific thermoplastic material enables excellent performance of the air-duct at both low and high use temperatures. Preferably the corrugated section of this air-duct has corrugations of such geometries that substantially prevent longitudinal elongation of the conduit when operating under pressure at high operating temperature.

In a preferred embodiment according to the invention, the thermoplastic material in the pressurized fluid conduit is a thermoplastic block copolyester elastomer, more preferably from a block copolyether ester elastomer.

A block copolyester contains soft blocks at a flexible polymer and hard blocks of a semi-crystalline polyester. A block copolymer or block is also being referred to as segmented copolymer or segment, respectively.

The hard polyester blocks in the block copolyester are built up of repeating units derived from at least one alkylene diol and at least one aromatic dicarboxylic acid or an ester thereof. The alkylene diol contains generally 2–6 C-atoms, preferably 2–4 C-atoms. Examples thereof include ethylene glycol, propylene diol and butylene diol. Preferably propylene diol or butylene diol is used, more preferably 1,4-butylene diol. Examples of suitable aromatic dicarboxylic acids include terephthalic acid, 1,4-naphthalene dicarboxylic acid, or 4,4'-biphenyl dicarboxylic acid. The hard segments may optionally also contain a minor amount of units derived from other dicarboxylic acids, for example isophthalic acid, which generally lowers the melting point of the polyester. The amount of other dicarboxylic acids is preferably limited, e.g. less than 10 mole %, to ensure that, among other things, the crystallization behaviour of the block copolyester is not adversely affected. The hard block is preferably based on polyethylene terephthalate, polypropylene terephthalate, and in particular on polybutylene terephthalate. The advantages thereof include favourable crystallization behaviour and a high melting point, resulting in semi-crystalline block copolyesters with good processing properties and excellent thermal and chemical resistance.

The soft blocks in the block copolyester contain a flexible polymer; that is a substantially amorphous polymer with a low glass-transition temperature ($T_g$) and low stiffness. Preferably the $T_g$ is below 0° C., more preferably below −20, and most preferably below −40° C. In principle various different polymers can be used as soft block, suitable examples are aliphatic polyethers, aliphatic polyesters, or aliphstic polycarbonates. The molar mass of the blocks may vary within a wide range, but preferably the molar mass is chosen between 400 and 6000, more preferably between 500 and 4000 g/mol.

An example of a suitable aliphatic polyether is a poly(alkylene oxide)diol derived from an alkylene oxide of 2–6 C-atoms; preferably 2–4 C-atom, or combinations-thereof. Examples include poly(ethylene oxide)diol, poly(tetramethylene oxide)diol, poly(propylene oxide)diol an ethylene oxide-terminated poly(propylene oxide)diol. The ratio of soft to hard blocks in the block copolyester may vary between wide limits, but is chosen such that a block copolyester of desired hardness is obtained. The hardness can generally be between about 20 and 80 Shore D, but for use in a pressurized fluid conduit according to the invention a hardness range of 50–65 Shore D is selected.

The block copolyester may also contain a compound with two or more functional groups that can react with an acid- or hydroxyl-group, acting as chain extension or chain branching agent, respectively. Examples of suitable chain extension agents include diisocyanates and bisepoxides. Suitable chain branching agents include e.g. trimellitic acid, trimellitic acid anhydride and trimethylol propane. The amount and type of chain extension or branching agent is chosen such that a block copolyester of desirable melt viscosity is obtained. In general, the amount of a chain branching agent will not be higher than 6.0 equivalents per 100 moles of dicarboxylic acids presenting the block copolymer. Chain branching agents are particularly useful for making block copolyesters of a viscosity level that is useful for processing techniques like extrusion blow-moulding.

The block copolyester may further contain customary additives, like stabilisers, anti-oxidants, colorants, processing aids or flame retarding compounds. Preferably the block copolyether ester contains a stabilisation and anti-oxidant package, which ensures that the material can withstand exposure to hot air during prolonged times: e.g. such that a test specimen shows a residual tensile elongation at break of over 100% after aging during 1000 hours at 150° C. in an air-circulation oven. The block copolyester may also be a mixture of two or more block copolyesters of different compositions, or a blend of a block copolyester and another polymer compatible therewith, like polybutylene terephthalate.

Examples and preparation of block copolyesters and their properties are for example described in Handbook of Thermoplastics, ed. O. Olabishi. Chapter 17, Marcel Dekker Inc., New York 1997, ISBN 0 8247 9797 3, in Thermoplastic Elastomers, 2nd Ed, Chapter 8, Carl Hanser Verlag (1996), ISBN 1-56990-205-4, in Encyclopedia of Polymer Science and Engineering, Vol. 12, Wiley & Sons. New York (1988), ISBN 0-471-80944, p.75–117, and the references cited therein.

In a particularly preferred embodiment, the pressurized fluid conduit comprises a mono-layer at a block copolyether ester with hard blocks based on polybutylene terephthalate and soft blocks based on poly(tetramethylene oxide)diol, poly(propylene oxide)diol or ethylene oxide-terminated poly(propylene oxide)diol. Preferably the molar mass of this soft block is 1000 g/mol or higher. The advantage thereof is a block copolyether ester with a combination of favourable low temperature flexibility and a melting point of above 180° C., or even above 200° C. Even more preferred is X block copolyether ester containing a soft block based on poly(propylene oxide)diol, especially an ethylene oxide-terminated poly(propylene oxide)diol of molar mass of 1000 g/mol or higher. The ratio between the number of propylene oxide and ethylene oxide units in such a polyether may vary within a wide range, for example between 20:1 and 1:6, preferably between 10:1 and 1:1. The advantage of such a block copolyester is a well balanced properties profile, combining low temperature flexibility with good mechanical strength that remains at an acceptable level up to temperatures close to 200° C. In addition, with a proper stabilisation/anti-oxidant system added, such material still shows sufficient mechanical properties after heat-aging at 150° during 1000 hours.

The invention also relates to the use of a semi-crystalline thermoplastic material with a hardness of between 50 and 65 Shore D and a modulus at 150° C. of at least 60 MPa for making a mono-layered pressurized fluid conduit via an extrusion (blow) moulding process for the reasons given above.

Preferably, this use concerns a semi-crystalline thermoplastic material, especially a polyester-based material, of further characteristics as described and explained above.

The invention further relates to a process for making a mono-layered pressurized fluid conduit comprising extrusion blow moulding at a semi-crystalline thermoplastic with a hardiness of between 50 and 70 Shore D.

In known processes polyamide-or polyester-based compositions are used. Disadvantages of polyamide-based compositions include their tendency to absorb water, resulting in change of mechanical properties. Disadvantages of polyamide- or polyester-based flexible blends with a low modulus or elastomeric polymer, include their processing behaviour in extrusion moulding, for example problematic die-swell phenomena and difficult formability at an extruded panson.

The object of the invention is therefore to provide a process for making a pressurized fluid conduit that does not, or at least to a much lesser extent, show these disadvantages.

This object is achieved with a process, wherein a block copolyester, especially a block copolyether ester, with a hardness of between 50 and 65 Shore D and a modulus at 150° C. of at least 60 MPa is used.

Preferably, the process according to the invention applies a block copolyether of further characteristics as described and explained above.

The invention will now be further elucidated by the following examples and comparative experiments.

Materials

Arnitel® P-X6313 and P-X6400 (DSM Engineering Plastics, NL) are heat-stabilised block copolyester elastomers of hardness 57 Shore D, based on polybutylene terephthalate hard blocks and ethylene oxide-terminated poly(propylene oxide)diol, comprising about 30 mass % of ethylene oxide soft blocks.

Hytrel® HTR4275 (DuPont de Nemours and Co., CH) is a heat-stabilised block copolyether ester of hardness 55 Shore D, and is based on poly(butylene terephthalate-co-butylene isophthalate) hard blocks and poly(tetramethylene oxide)diol soft blocks.

Hardness according to Shore D was measured on a sample following the instructions of ISO 868. Melt viscosity was measured with a Rheometrice RMS-800 apparatus at 240° C. after a residence time of about 15 minutes, using a dynamic operating mode with frequency sweep and a disk and plate geometry. Moduli (moduli determined in strain) at different temperatures were determined using a Rheometrics RSA-II DMS at a frequency of 1 Hz and heating rate of 5° C./min on samples of about 2.0 mm width, 0.09 mm thickness and length between clamps of about 21.8 mm, which method follows ASTM D5026.

Some relevant material properties are given in Table 1, P-X6400 is of the same composition and properties as P-X6313. but has melt viscosity 26.0 kPa·s (at 240° C. and 1 s$^{-1}$).

TABLE 1

| Material | hardness (Shore D) | Melt viscosity at 240° C.; 1 rad.s$^{-1}$ (kpa · s) | modulus (in strain) at 150° C. (MPa) | at 160° C. (MPa) | at 170° C. (MPa) |
|---|---|---|---|---|---|
| P-X6313 | 57 | 9.7 | 88 | 78 | 67 |
| HTR4275 | 55 | 20.0 | 36 | 27 | 20 |

EXAMPLE I

P-X6313 was used to produce a virtually V-shaped air-duct of about 150 cm length and having two corrugated sections, via a suction blow-moulding technique on a Milacron machine Temperature settings were about 225–235° C. (from hopper to nozzle), resulting in a melt temperature of about 225° C. Air-ducts with different wall thickness were made, such that the air-duct would resist a minimum pressure of 450 kPa in a burst-pressure test performed at 150° C. As is shown in Table 2 an air-duct with part weight or about 445 gram easily passed this burst-pressure test. The bending flexibility of this air-duct, as judged from manual deformation to mimic handling and mounting in practice, was found to be significantly higher than the duct of Comparative experiment A, while the measured burst-pressure was even 12% higher. In addition, significant saving in material use compared to the comparative experiment A was possible.

Comparative Experiment A

The material HTR4275 was used to produce the same air-duct of Example I under Similar conditions. In order to withstand a minimum pressure of 450 kPa in a burst-pressure test performed at 150° C., the wall thickness of the air-duct had to be chosen such that a part weight of 585 gram resulted.

EXAMPLE II

P-X6400 was used to produce a J-like shaped air-duct of about 50 cm length and having one corrugated section, via a 3-D manipulated blow-moulding technique on a Fisher W. Muller machine. Temperature settings were about 225–235° C. (from hopper to nozzle), resulting in a melt temperature of about 230° C. Air-ducts with different wall thickness were made, such that the air-duct would resist a deformation test, wherein no collapsing of the duct should occur when the inside of the air-duct is kept at a pressure that is 20 kPa lower than the pressure outside at 145° C. It was found that an air-duct with part weight of about 269 gram or higher passed this test. The bending flexibility of such an air-duct was found to be markedly higher than the duct of Comparative experiment B. and saving in material use amounted to over 26%.

Comparative Experiment B

The material HTR4275 was used to produce a same air-duct as in example II under similar conditions. In order to pass the indicated deformation test, the wall thickness of the air-duct had to be at least such that a part weight of 365 gram resulted.

The invention claimed is:

1. Pressurized fluid conduit comprising a mono-layer of a semi-crystalline thermoplastic material having a hardness of between 50 and 65 Shore D and a modulus at 150° C. of at least 60 MPa, as measured with DMS on a test-sample dynamically elongated at 1 Hz, following ASTM D5026.

2. Pressurized fluid conduit according to claim 1, wherein the thermoplastic material has a hardness of between 52 and 63 Shore D.

3. Pressurized fluid conduit according to claim 1, wherein the thermoplastic material has a modulus at 160° C. of at least 60 MPa.

4. Pressurized fluid conduit according to claim 1, wherein the conduit is an extrusion blow-moulded part and the thermoplastic material displays a melt viscosity, as measured at 240° C. and at shear rate 1 s$^{-1}$, of between 9 and 30 kPa·s.

TABLE 2

| | Material | Part weight (gram) | Burst-pressure at 150 ° C. (kPa) | Air-duct flexibility at room temperature | Relative weight saving (%) |
|---|---|---|---|---|---|
| Comp. Exp. A | HTR4275 | 585 | 465 | Insufficient | — |
| Example 1 | P-X6313 | 445 | 520 | Excellent | 24 |

5. Pressurized fluid conduit according to any claim 1, wherein the conduit comprises at least one section with wall geometries, like corrugations or convolutes, which affect deflection of the conduit.

6. Pressurized fluid conduit according to claim 1, wherein the conduit is an automobile air-duct.

7. Pressurized fluid conduit according to claim 1, wherein the thermoplastic material is a block copolyester.

8. Pressurized fluid conduit according to claim 7, wherein the block copolyester is a block copolyether ester.

9. Pressurized fluid conduit according to claim 7, wherein the block copolyester contains polybutylene terephthalate as hard blocks.

10. Pressurized fluid conduit according to claim 8, wherein the block copolyether ester contains a poly(propylene oxide)diol.

11. Pressurized fluid conduit according to claim 8, wherein the block copolyether ester contains polybutylene terephthalate as hard blocks and a poly(propylene oxide) diol, optionally ethylene oxide-terminated, as soft blocks.

12. A process for making mono-layered pressurized fluid conduit comprising extrusion molding a semi-crystalline thermoplastic material with a hardness of between 50 and 65 Shore D and a modulus at 150° C. of at least 60 MPa, as measured with DMS on a test-sample dynamically elongated at 1 Hz, following ASTM D5026, for making into a mono-layered pressurized fluid conduit via an extrusion moulding process.

13. A process according to claim 12, wherein the thermoplastic material has a hardness of between 52 and 63 Shore D.

14. Process according to claim 12, wherein the conduit is an automobile air-duct.

15. A process according to claim 12, wherein the thermoplastic material has a modulus at 160° C. of at least 60 MPa.

16. A process according to claim 12, wherein the thermoplastic material displays a melt viscosity, as measured at 240° C. and at shear rate 1 $s^{-1}$, of between 9 and 30 kPa·s and wherein the fluid conduit part is extrusion blow molded.

17. A pressurized automobile air duct produced by the method of claim 12.

18. Process for making a mono-layered pressurized fluid conduit comprising extrusion blow moulding of a thermoplastic material, wherein the thermoplastic material comprises a block copolyester with a hardness of between 50 and 65 Shore D and a modulus at 150° C. of at least 60 MPa, as measured with DMS on a test-sample dynamically elongated at 1 Hz following ASTM D5026, is applied as thermoplastic material.

19. Process according to claim 18, wherein the block copolyester has a hardness of between 52 and 63 Shore D.

20. Process according to claim 18, wherein the conduit is an automobile air-duct.

21. A process according to claim 18, wherein the block copolyester is a block copolyether ester.

22. A process according to claim 21, wherein the block copolyether ester contains polybutylene terephthalate as hard blocks and a poly(propylene oxide)diol, optionally ethylene oxide-terminated, as soft blocks.

23. A process according to claim 18, wherein the block copolyether contains polybutylene terephthalate as hard blocks.

24. A process according to claim 18, wherein the block copolyether ester contains a poly(propylene oxide)diol.

25. A process according to claim 18, wherein the block copolyether has a modulus at 160° C. of at least 60 MPa.

26. A process according to claim 18, wherein the block copolyester displays a melt viscosity, as measured at 240° C. and at shear rate 1 $s^{-1}$, of between 9 and 30 kPa·s.

27. A pressurized automobile air duct produced by the method of claim 18.

* * * * *